(12) United States Patent
Uchida (10) Patent No.: US 10,255,225 B2
(45) Date of Patent: Apr. 9, 2019

(54) COMPUTER MOUNTING MULTIPLE MODULES FACILITATING OPENING/EXPANSION CONTROL PROCESS WITH CONNECTORS

(71) Applicant: NEC Corporation, Tokyo (JP)

(72) Inventor: Kazuya Uchida, Tokyo (JP)

(73) Assignee: NEC Corporation, Tokyo (JP)

( * ) Notice: Subject to any disclaimer, the term of this patent is extended or adjusted under 35 U.S.C. 154(b) by 281 days.

(21) Appl. No.: 15/076,994

(22) Filed: Mar. 22, 2016

(65) Prior Publication Data

US 2016/0292124 A1 Oct. 6, 2016

(30) Foreign Application Priority Data

Mar. 30, 2015 (JP) .................................. 2015-068248

(51) Int. Cl.
*G06F 13/42* (2006.01)
*G06F 13/40* (2006.01)
(52) U.S. Cl.
CPC ...... *G06F 13/4282* (2013.01); *G06F 13/4086* (2013.01)
(58) Field of Classification Search
None
See application file for complete search history.

(56) References Cited

U.S. PATENT DOCUMENTS 6,141,769 A * 10/2000 Petivan .................. G06F 11/165 714/10
6,924,986 B1 * 8/2005 Sardella ............... H05K 7/1429 361/785
2009/0213544 A1 * 8/2009 Dittus ................. H05K 7/20727 361/695
2011/0189868 A1 * 8/2011 Kirk ...................... H05K 1/0228 439/74
2014/0068286 A1 * 3/2014 Nguyen .................. G06F 1/181 713/300

(Continued)

FOREIGN PATENT DOCUMENTS

JP 7-225640 8/1995
JP 2004-30315 1/2004

(Continued)

OTHER PUBLICATIONS

Japanese Office Action dated Apr. 26, 2016, by the Japanese Patent Office in counterpart Japanese Patent Application No. 2015-068248.

*Primary Examiner* — Michael Sun
(74) *Attorney, Agent, or Firm* — Finnegan, Henderson, Farabow, Garrett & Dunner, L.L.P.

(57) ABSTRACT

A computer includes a first module, a second module controlled by the first module, a first connector connectible to the first module, a second connector connectible to either the first module or the second module, and a data transmission line configured to connect the first connector to the second connector via a plurality of lanes. The order of lanes of the first module is reverse to the order of lanes of the second module while the order of lanes of the first connector is reverse to the order of lanes of the second connector. Thus, it is possible to improve the expandability of the computer acting as a server. Additionally, it is possible to prevent complexity of design and increased cost in expanding the functions of servers.

7 Claims, 6 Drawing Sheets

(56) References Cited

U.S. PATENT DOCUMENTS

2016/0104972 A1* 4/2016 Feng .................. H01R 13/6581
  439/607.27
2016/0353603 A1* 12/2016 Jau ....................... H05K 7/1491
2017/0054835 A1* 2/2017 Gadi ................... H04M 1/0277

FOREIGN PATENT DOCUMENTS

| JP | 2004-206462 | 7/2004 |
| JP | 2009-187172 | 8/2009 |
| JP | 2012-22463 | 2/2012 |

* cited by examiner

COMPUTER MOUNTING MULTIPLE MODULES FACILITATING OPENING/EXPANSION CONTROL PROCESS WITH CONNECTORS

TECHNICAL FIELD

The present invention relates to a computer mounting multiple modules which facilitate opening/expansion control processes with connectors.

The present application claims priority on Japanese Patent Application No. 2015-68248, the content of which is incorporated herein by reference.

BACKGROUND ART

Computers each mounting multiple modules in a single chassis may include different types of slots such as a slot connectible to a CPU module, a slot connectible to a storage module, and a slot connectible to an I/O module.

Patent Literature Document 1 discloses a server including a CPU-module connector connectible to a CPU module, an IO-module connector connectible to an IO module, and a CPU/IO-module combined connector selectively connectible to either a CPU module or an IO module. Herein, the CPU/IO-module combined connector is designed to unify a CPU-module connector and an IO-module connector; hence, it includes two sockets individually receiving a CPU module and an IO module.

CITATION LIST

Patent Literature Document

Patent Literature Document 1: Japanese Patent Application Publication No. 2009-187172

SUMMARY OF INVENTION

Technical Problem

A computer such as a micro server including a plurality of slots is designed to mount a CPU module and an expansion module according to a client's specification. The server of Patent Literature Document 1 including a plurality of slots dedicated to various types of modules needs to be changed in design according to a client's specification; hence, it may need a complex design which in turn increases manufacturing cost.

The present invention aims to improve an expandability while preventing complexity of design and increased manufacturing cost with a computer such as a high-density server mounting multiple modules which facilitate opening/expansion control processes with connectors.

Solution to Problem

In a first aspect of the invention, a computer includes a first module, a second module controlled by the first module, a first connector connectible to the first module, a second connector connectible to either the first module or the second module, and a data transmission line configured to connect the first connector to the second connector via a plurality of lanes. Herein, the order of lanes of the first module is reverse to the order of lanes of the second module while the order of lanes of the first connector is reverse to the order of lanes of the second connector.

In a second aspect of the invention, a server is configured using the computer, wherein the first module includes a control unit while the second module includes an expansion unit configured to expand the function of the control unit.

In a third aspect of the invention, a module is configured to be detachably attached to either a first connector or a second connector connectible to the first connector through a data transmission line via a plurality of lanes. The module has an order of lanes which is identical to the order of lanes of the first connector but reverse to the order of lanes of the second connector.

In a fourth aspect of the invention, a connector set is configured to be detachably attached to either a first module or a second module controlled by the first module. The connector set includes a first connector connectible to the first module, a second connector connectible to either the first module or the second module, and a data transmission line configured to connect the first connector to the second connector via a plurality of lanes. Herein, the order of lanes of the first connector is identical to the order of lanes of the first module while the order of lanes of the second connector is identical to the order of lanes of the second module.

In a fifth aspect of the invention, an assembling method is applied to a computer including a first module, a second module controlled by the first module, a first connector connectible to the first module, a second connector connectible to either the first module or the second module, and a data transmission line configured to connect the first connector to the second connector via a plurality of lanes. Herein, the order of lanes of the first module is reverse to the order of lanes of the second module while the order of lanes of the second module is identical to the order of lanes of the second connector. According to the assembling method, the first module is attached to the first connector, and then either the first module or the second module is attached to the second connector.

In a sixth aspect of the invention, a control method of the computer includes a determination process configured to determine whether or not the first module recognizes the second module, an expansion control process configured to allow the first module to control the second module when the determination process determines that the first module recognizes the second module, and an independent operation process configured to independently operate the first module when the determination process does not determine that the first module recognizes the second module.

In a seventh aspect of the invention, an opening control program causing the first module of the computer to implement the determination process, the expansion control process, and the independent operation process.

Advantageous Effects of Invention

According to the present invention, it is possible to improve the expandability of a computer acting as a server. Additionally, it is possible to prevent complexity of design and increased cost in expanding functions of servers.

DESCRIPTION OF EMBODIMENTS

The present invention will be described in detail by way of examples with reference to accompanying drawings.

Figure 1:
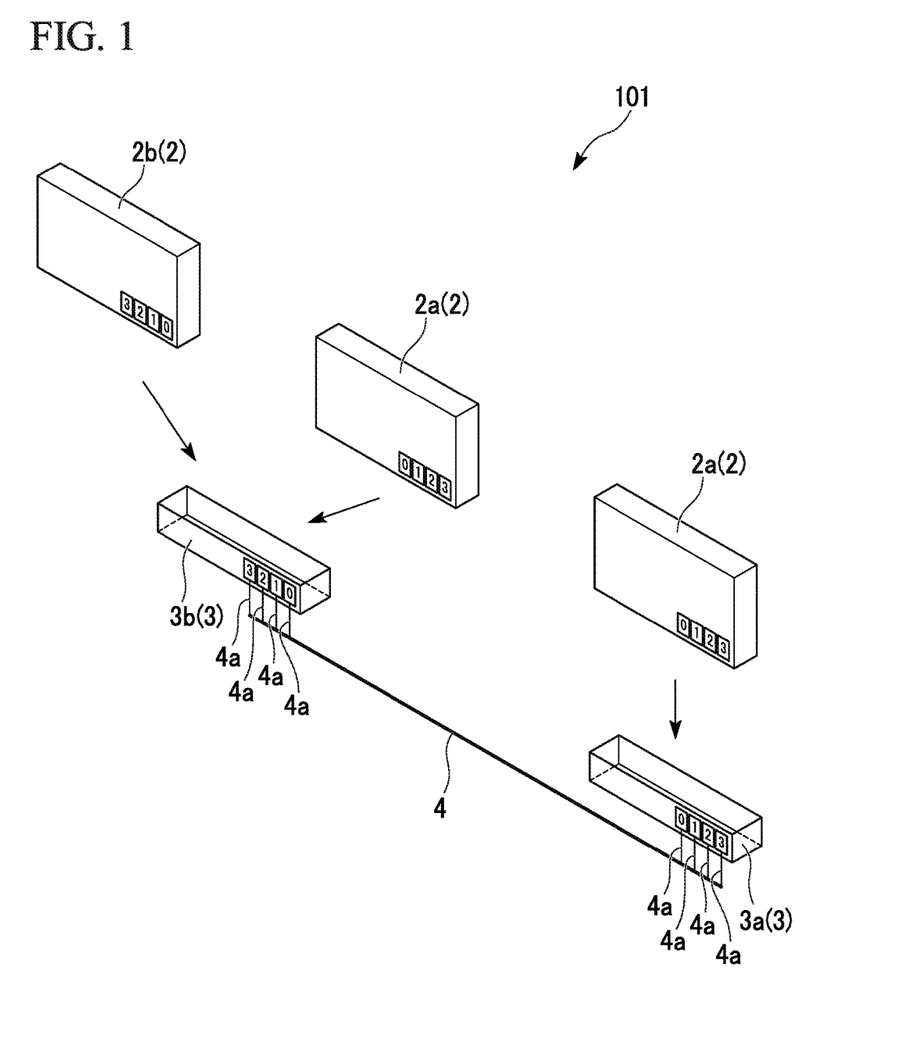
FIG. 1 is a perspective view of a computer according to the first embodiment of the present invention.

FIG. 1 is a perspective view of a computer 101 according to the first embodiment of the present invention. The computer 101 includes modules 2, connectors 3, and a data transmission line 4. For example, the computer 101 is applicable to a hybrid high-density server mounting a plurality of server units.

The modules 2 include hardware elements and programs implementing various functions. Specifically, the computer 101 includes at least two types of modules 2 having different functions such as a first module 2a and a second module 2b. The first module 2a includes a CPU (Central Processing Unit) configured to carry out various calculations and control processes. The second module 2b is controlled by the first module 2a. The second module 2b is an expansion module designed to expand the function of the first module 2a. For example, the second module 2b may serve as an expansion module mounting a network interface. The first and second modules 2a, 2b are individually connectible to the connectors 3. That is, the first embodiment employs a module set including at least two types of modules 2, i.e. the first and second modules 2a, 2b.

The computer 101 includes two types of connectors 3 such as a first connector 3a and a second connector 3b. The first connector 3a receives the first module 2a while the second connector 3b selectively receives either the first module 2a or the second module 2b. According to the operational reason, the computer 101 prevents the first connector 3a from receiving the second module 2b. Similar to the second connector 3b, the first connector 3a has a shape to detachably receive the first and second modules 2a, 2b.

The data transmission line 4 is connected between the first connector 3a and the second connector 3b. The data transmission line 4 enables data transmission between the first connector 3a and the second connector 3b. For example, the data transmission line 4 is standardized under "PCI Express (Peripheral Components Interconnect Express)". Specifically, the data transmission line 4 includes a plurality of transmission lines 4a in connection with a plurality of lanes. For the sake of simplicity in illustration, FIG. 1 shows a single transmission line 4a corresponding to a single lane; in actuality, a single lane corresponds to a plurality of transmission lines 4a so as to carry out interactive communications. FIG. 1 shows the data transmission line 4 implementing four lanes; but the number of lanes is not necessarily limited to four. The first embodiment employs a connector set including the first and second connectors 3a, 3b and the data transmission line 4.

The order of lanes of the first module 2a is reverse to the order of lanes of the second modules 2b. For example, four lane numbers can be read from the left to the right in FIG. 1 such that the lane numbers "0, 1, 2, 3" are assigned to the first module 2a while the lane numbers "3, 2, 1, 0" are assigned to the second module 2b. Herein, the order of lanes of the first module 2a is reverse to the order of lanes of the second module 2b on the precondition that the both the front faces of the first and second modules 2a, 2b are aligned in the same direction and connected to the connectors 3a, 3b.

Similarly, the order of lanes of the first connector 3a is reverse to the order of lanes of the second connector 3b. For example, four lane numbers can be read from the left to the right in FIG. 1 such that the lane numbers "0, 1, 2, 3" are assigned to the four transmission lines 4a of the first connector 3a while the lane numbers "3, 2, 1, 0" are assigned to the four transmission lines 4a of the second connector 3b.

The first and second modules 2a, 2b can recognize each other only when the lane number of the first module 2a matches the lane number of the second module 2b through the transmission line 4a. For example, the first and second modules 2a, 2b attached to the first and second connectors 3a, 3b can recognize each other through the data transmission line 4 in four cases (i) to (iv) as follows.

(i) The first and second modules 2a, 2b are connected together through the transmission line 4a corresponding to the lane number "0".

(ii) The first and second modules 2a, 2b are connected together through the transmission line 4a corresponding to the lane number "1".

(iii) The first and second modules 2a, 2b are connected together through the transmission line 4a corresponding to the lane number "2".

(iv) The first and second modules 2a, 2b are connected together through the transmission line 4a corresponding to the lane number "3".

Figure 2:
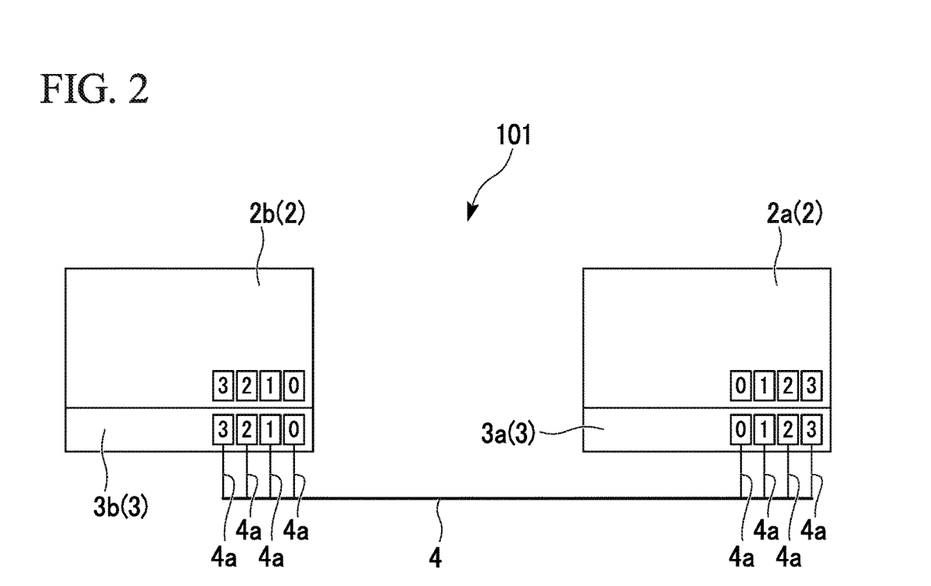
FIG. 2 is a schematic diagram showing first and second modules attached to first and second connectors which are connected together through a data transmission line in the computer of the first embodiment.
Figure 3:
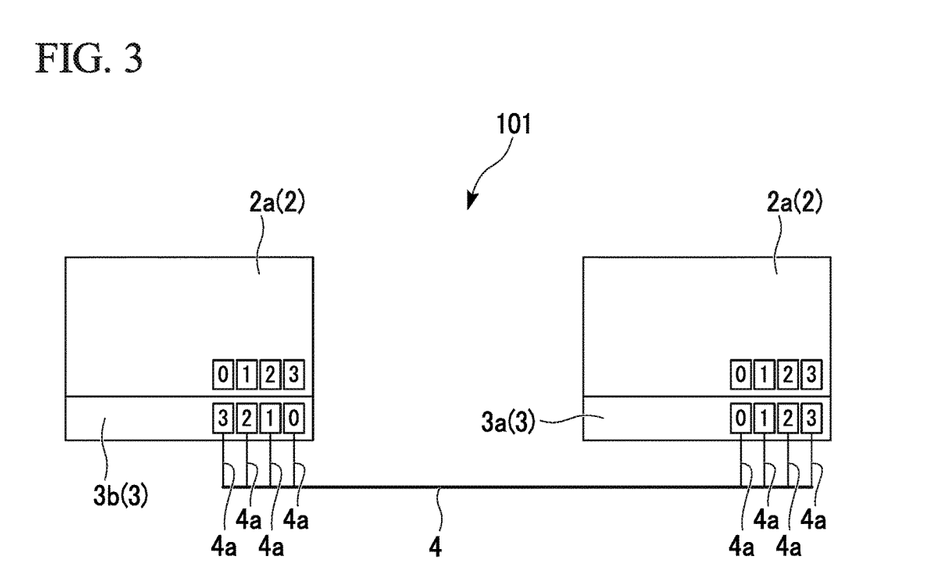
FIG. 3 is a schematic diagram showing a pair of first modules attached to first and second connectors which are connected together through a data transmission line in the computer of the first embodiment.

FIG. 2 shows the first and second modules 2a, 2b attached to the first and second connectors 3a, 3b which are connected together through the data transmission line 4 in the computer 101 of the first embodiment. FIG. 3 shows a pair of first modules 2a attached to the first and second connectors 3a, 3b through the data transmission line 4 in the computer 101 of the first embodiment.

As shown in FIG. 2 in which the first and second modules 2a, 2b are attached to the first and second connectors 3a, 3b, it is possible to carry out data transmission between the first and second modules 2a, 2b which are connected together through the data transmission line 4 since the lane numbers of the first module 2a match the lane numbers of the second module 2b. Thus, it is possible for the first module 2a to control the second module 2b.

As shown in FIG. 2 in which a pair of first modules 2a is attached to the first and second connectors 3a, 3b, the lane numbers of the first module 2a attached to the first connector 3a do not match the lane numbers of the first module 2a attached to the second connector 3b through the data transmission line 4. That is, the first module 2a attached to the first connector 3a cannot recognize the first module 2a attached to the second connector 3b. For this reason, it is possible to independently operate the first modules 2a without using any identification process.

In result, it is unnecessary to provide specific connectors dedicated to the first and second modules 2a, 2b; hence, it is possible to prevent the complexity of design due to any design change under a client's specification. Additionally, it is possible to provide a simple configuration which allows the first module 2a attached to the first connector 3a to discriminate the module type attached to the second connector 3b, thus preventing an increase in cost.

Next, the second embodiment of the present invention will be described in detail with reference to FIG. 4. The second embodiment differs from the first embodiment in that a plurality of connectors (corresponding to the connectors 3 used in the first embodiment) is arrayed on a substrate. In the second embodiment shown in FIG. 4, the same reference signs are used to denote the same parts as the first embodiment; hence, duplicate descriptions thereof will be omitted.

Figure 4:
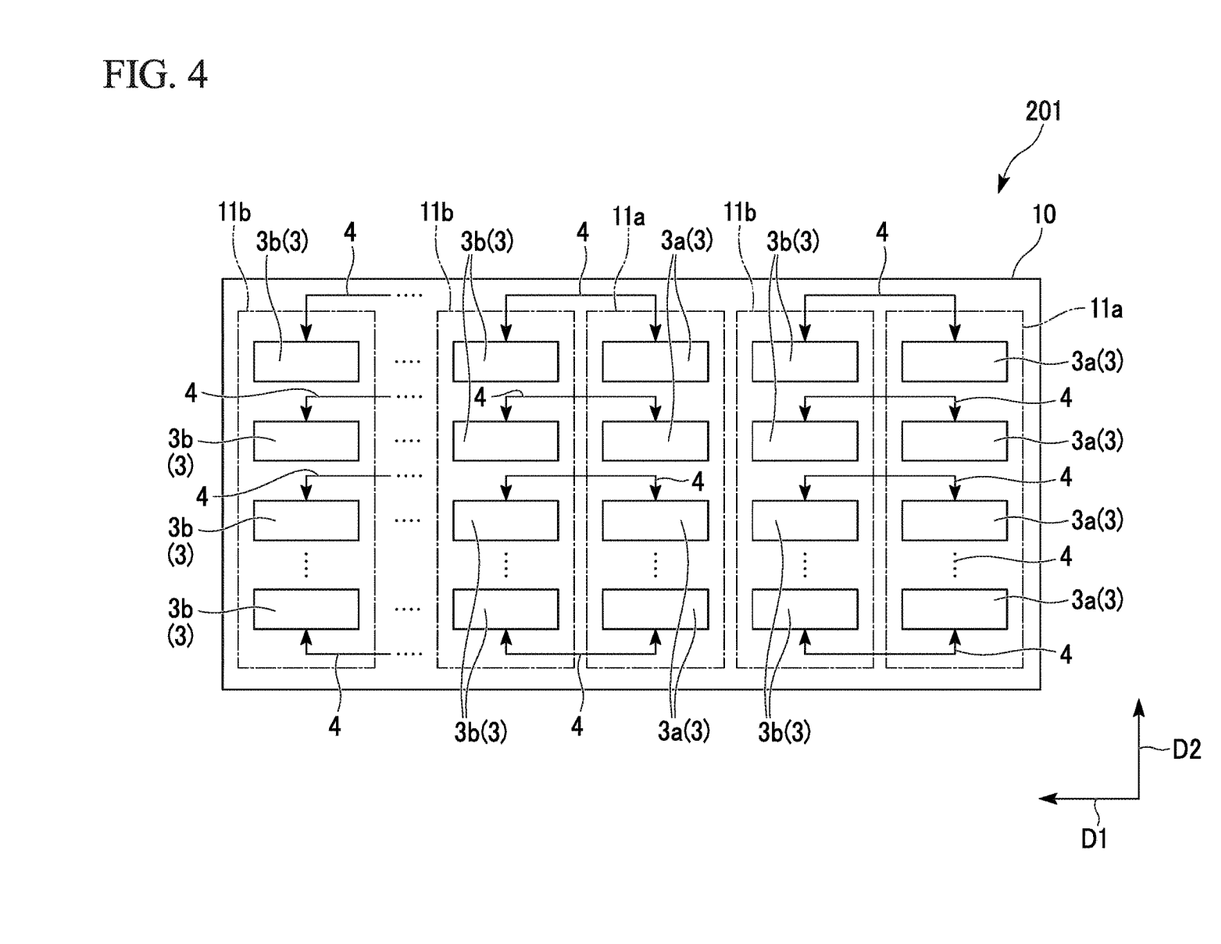
FIG. 4 is a plan view of a computer according to the second embodiment of the present invention.

FIG. 4 is a plan view of a computer 201 according to the second embodiment of the present invention. The computer 201 of the second embodiment includes modules 2 (not shown), connectors 3, data transmission lines 4, and a substrate 10.

The connectors 3 are fixed onto the substrate 10. The connectors 3 are aligned in a matrix defined by rows and columns in first and second directions D1, D2 perpendicular to each other (see arrows in FIG. 4). The second embodiment refers to the first and second directions D1, D2 which are perpendicular to each other in FIG. 4; but, this is not a restriction. Additionally, the second embodiment refers to different numbers of connectors 3 aligned in the first and second directions D1, D2 in FIG. 4; but this is not a restriction.

Similar to the first embodiment, the second embodiment refers to the connectors 3 including the first and second connectors 3a, 3b. In FIG. 4, the connectors 3 are aligned in columns, i.e. odd-number columns 11a and even-number columns 11b (which are counted from the right to the left in FIG. 4). The first connectors 3a are aligned in the odd-number columns 11a while the second connectors 3b are aligned in the even-number columns 11b. Herein, each odd-number column refers to as an N column while each even-number column 11 refers to as a N+1 column; that is, the N and N+1 columns adjoins together in the first direction D1. A pair of first and second connectors 3a, 3b adjoining in the N and N+1 columns is connected together through the data transmission line 4.

The substrate 10 can be made using a PCB (Printed Circuit Board). The substrate 10 is enclosed in a chassis (not shown). A plurality of data transmission lines 4 is formed on the substrate 10. For example, the substrate 10 is a multi-layered printed circuit board.

The second embodiment is able to simply cooperate the first and second modules 2a, 2b together. That is, the first module 2a is connected to the first connector 3a while the second connector 2b is connected to the second connector 3b which adjoins the first connector 3a in the first direction D1.

Thus, it is possible for the first module 2a to control the second module 2b through the data transmission line 4 formed on the substrate 10. When an operator handling the computer 201 prefers to solely operate the first module 2a without being connected to the second module 2b, it is possible for an operator to solely connect the first module 2a to any one of the first connectors 3a on the substrate 4. For this reason, it is possible for an operator to easily grasp the connected conditions between the first and second modules 2a, 2b adjoining in the first direction D1 even when a plurality of connectors 3 is aligned on the substrate 10.

The second embodiment is designed such that the longitudinal direction of each connector 3 matches the first direction D1; this makes it easy for an operator to recognize the first direction D1 based on the longitudinal direction of each connector 3.

The second embodiment refers to the longitudinal direction of each connector 3 in correspondence with the first direction D1; but this is not a restriction. For example, it is possible to modify the computer 201 such that the crosswise direction (or short-side direction) of each connector 3 matches the first direction D1. In a modification of the computer 201 in which the crosswise direction of each connector 3 matches the first direction D1, it is possible to connect the first and second connectors 3a, 3b via the shortest distance. This modification is advantageous due to a reduced wiring impedance of the data transmission line 4.

Figure 5:
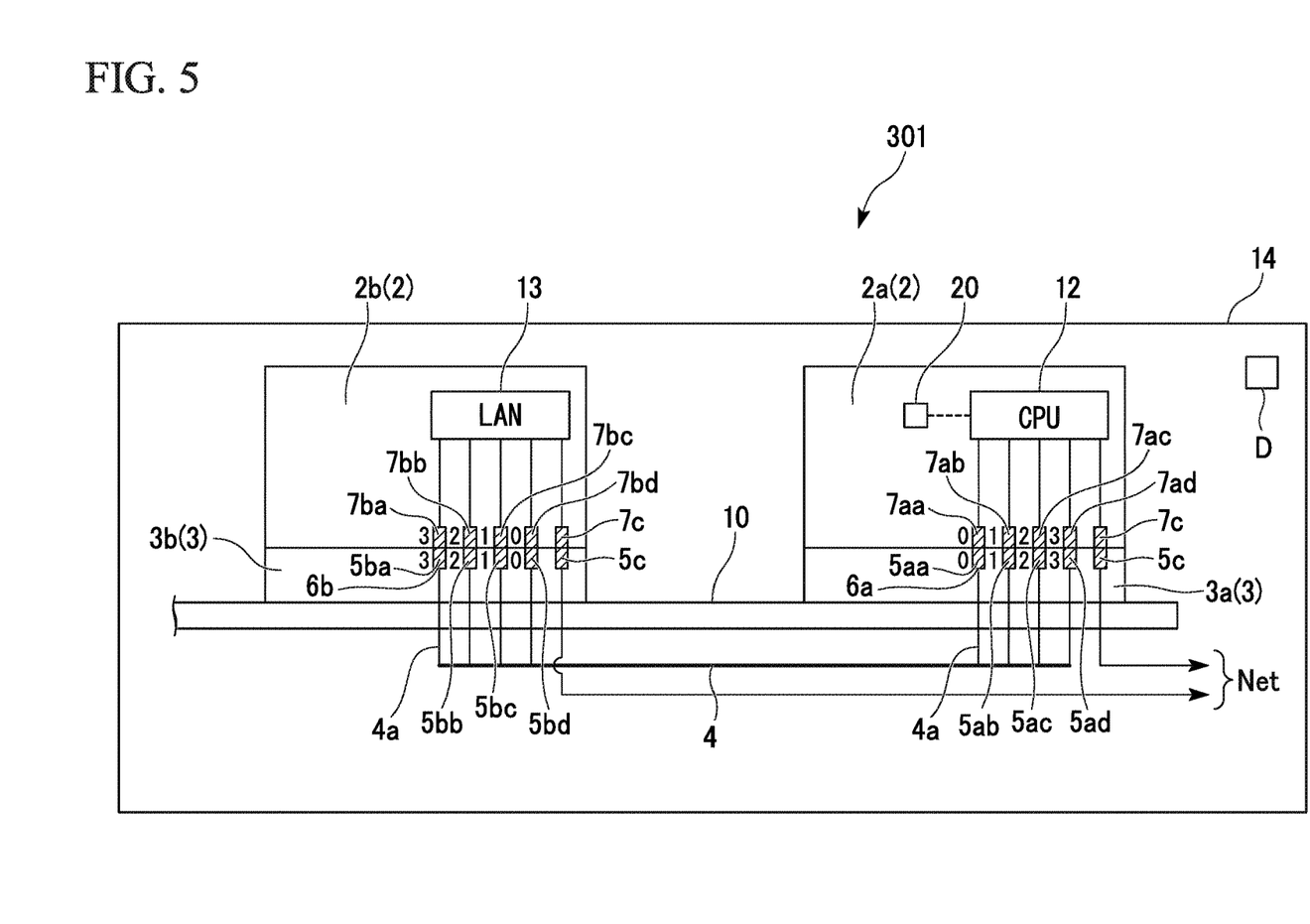
FIG. 5 is a schematic diagram showing the configuration of a computer according to the third embodiment of the present invention employing the configuration of the first embodiment shown in FIG. 2.
Figure 6:
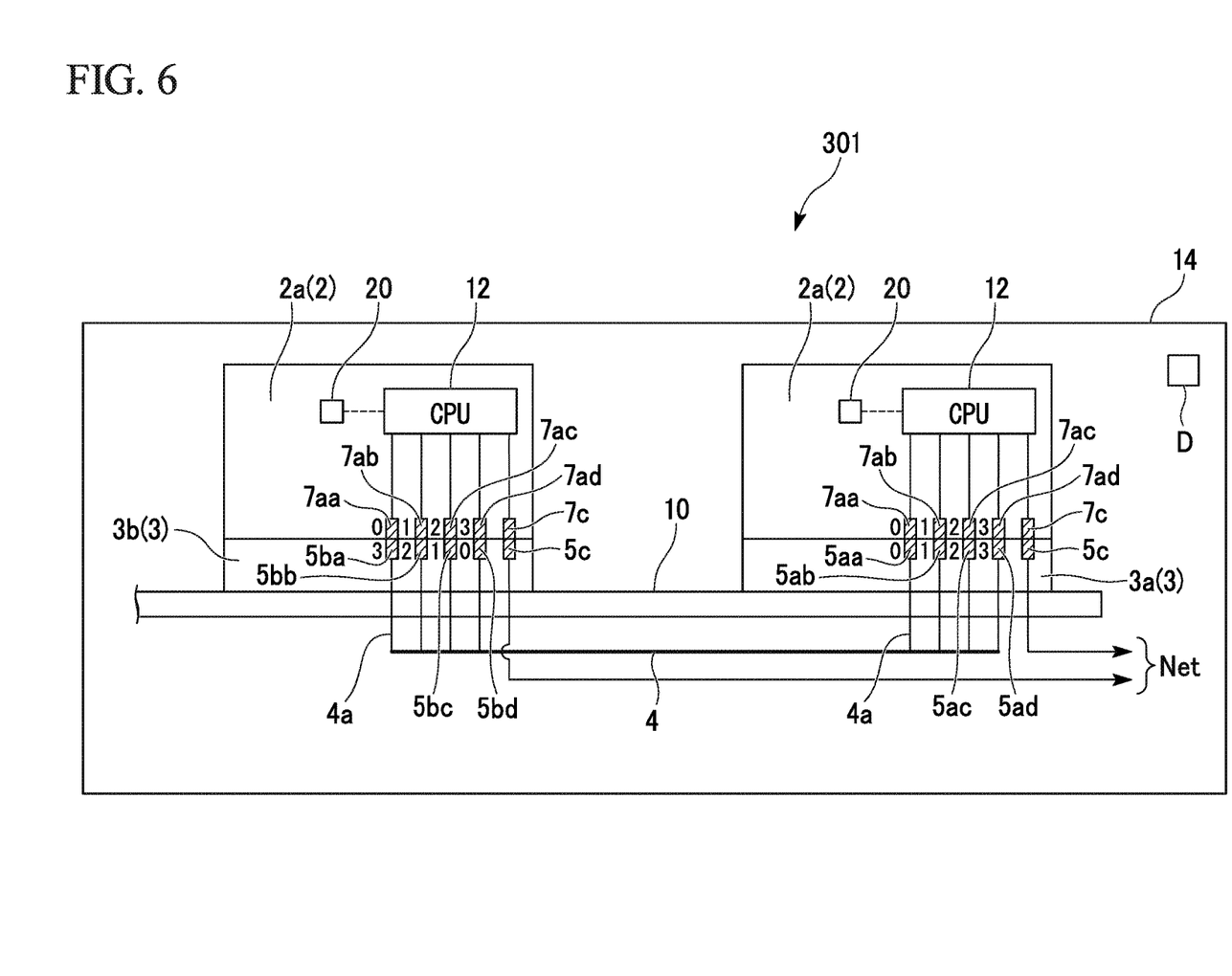
FIG. 6 is a schematic diagram showing the configuration of a computer according to the third embodiment of the present invention employing the configuration of the first embodiment shown in FIG. 3.

Next, the third embodiment of the present invention will be described in detail with reference to FIGS. 5 to 8. The third embodiment refers to a high-density server mounting a plurality of server units each employing the computer 101 of the first embodiment or the computer 201 of the second embodiment. In FIGS. 5 and 6, the same reference signs in FIGS. 1 to 4 are used to denote the same parts as the first and second embodiments; hence, duplicate descriptions will be omitted. In actuality, the third embodiment employs a plurality of connector sets; but the third embodiment refers to one connector set in the following descriptions.

FIG. 5 is a schematic diagram showing the configuration of a computer 301 according to the third embodiment employing the configuration of the first embodiment shown in FIG. 2. FIG. 6 is a schematic diagram showing the configuration of a computer 301 according to the third embodiment employing the configuration of the first embodiment shown in FIG. 3.

The computer 301 of FIG. 5 includes the first and second modules 2a, 2b, the first and second connectors 3a, 3b, the data transmission line 4, the substrate 10, and a chassis 14. The first module 2a includes a control unit (e.g. a CPU) 12 while the second module 2b includes an expansion unit (e.g. a LAN) 13. The second module 2b expands the communication function of the first module 2a.

The data transmission line 4 includes a plurality of transmission lines 4a. Similar to the first embodiment, the third embodiment refers so the data transmission line 4 including four transmission lines 4a. The first connector 3a includes a plurality of electrodes 5aa, 5ab, 5ac, and 5ad which are linearly aligned. The transmission lines 4a have first terminals 6a connectible to the electrodes 5aa, 5ab, 5ac, and 5ad of the first connector 3a. Additionally, the second connectors 3b includes a plurality of electrodes 5ba, 5bb, 5bc, and 5bd which are linearly aligned. The electrodes 5aa, 5ab, 5ac, and 5ad of the first connector 3a are aligned similarly in correspondence with the electrodes 5ba, 5bb, 5bc, and 5bd of the second connector 3b; that is, those electrodes are aligned from the left to the right in FIG. 5. The transmission lines 4a have second terminals 6b connectible to the electrodes 5ba, 5bb, 5bc, and 5bd of the second connector 3b.

The first connector 3a is connected to the second connector 3b through the data transmission line 4 such that the electrodes 5aa, 5ab, 5ac, and 5ad are connected to the electrodes 5ba, 5bb, 5bc, and 5bd through the transmission lines 4a. Specifically, the electrode 5aa is connected to the electrode 5bd; the electrode 5ab is connected to the electrode 5bc; the electrode 5ac is connected to the electrode 5bb; and the electrode 5ad is connected to the electrode 5ba. That is, the first and second connectors 3a, 3b have reverse orders of lane numbers such that the electrodes 5ba, 5bb, 5bc, and 5bd are aligned in the reverse order compared to the electrodes 5aa, 5ab, 5ac, and 5ad.

The first module 2a includes a plurality of electrodes 7aa, 7ab, 7ac, and 7ad used to carry out data transmission with the second module 2b. The first module 2a is attached to the first connector 3a such that the electrodes 7aa, 7ab, 7ac, and 7ad are connected to the electrodes 5aa, 5ab, 5ac, and 5ad. Specifically, the electrode 7aa is connected to the electrode 5aa; the electrode 7ab is connected to the electrode 5ab; the electrode 7ac is connected to the electrode 5ac; and the electrode 7ad is connected to the electrode 5ad.

Similarly, the second module 2b includes a plurality of electrodes 7ba, 7bb, 7bc, and 7bd used to carry out data transmission with the first module 2a. The second module 2b is attached to the second connector 3b such that the electrodes 7ba, 7bb, 7bc, and 7bd are connected to the electrodes 5ba, 5bb, 5bc, and 5bd. Specifically, the electrode 7ba is connected to the electrode 5ba; the electrode 7bb is connected to the electrode 5bb; the electrode 7bc is connected to the electrode 5bc; and the electrode 7bd is connected to the electrode 5bd.

Additionally, it is possible to attach the first module 2a to the second connector 3b such that the electrodes 7aa, 7ab, 7ac, and 7ad are connected to the electrodes 5ba, 5bb, 5bc, and 5bd. Specifically, the electrode 7aa is connected to the electrode 5ba; the electrode 7ab is connected to the electrode 5bb; the electrode 7ac is connected to the electrode 5bc; and the electrode 7ad is connected to the electrode 5bd.

For example, the data transmission line 4 based on the "PCI Express" standard employs the lane reverse function in which the control unit 12 automatically reverses the order of lanes in the first module 2a. In this case, it is possible to install a lane reverse suspension part 20 configured to suspend the lane reverse function in the first module 2a.

Each of the first and second connectors 3a, 3b includes a third electrode 5c connectible to a network (Net) such as a LAN (Local Area Network). The third electrode 5c of the first connector 3a is disposed at the same position as the third connector 5c of the second connector 3b.

Each of the first and second modules 2a, 2b includes an electrode 7c electrically connectible to the third electrode 5c. Herein, the electrode 7c can be electrically connected to the third electrode 5c even when each of the first and second modules 2a, 2b is attached to either the first connector 3a or the second connector 3b. That is, it is possible for the first module 2a to operate independently (e.g. a communication with an external device) even when the first module 2a is attached to either the first connector 3a or the second connector 3b.

Figure 7:
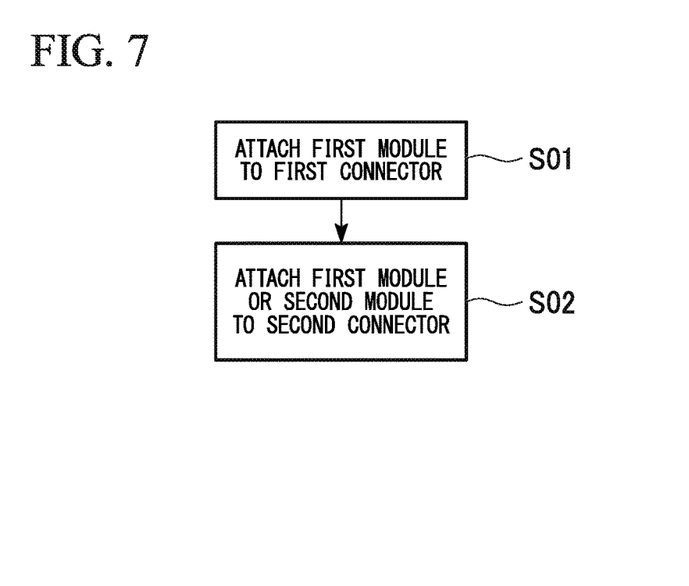
FIG. 7 is a flowchart showing an assembling method with respect to the computer of the third embodiment.

Next, an assembling method will be described with respect to the computer 301 of the third embodiment. FIG. 7 is a flowchart showing the assembling method of the computer 301 of the third embodiment. First, the first module 2a is attached to the first connector 3a (step S01). Next, either the first module 2a or the second module 2b is attached to the second connector 3b (step S02).

As shown in FIG. 6, the first module 2a is attached to the first connector 3a disposed in the N row (i.e. an odd-number row), and therefore the control unit 12 is electrically connected to the first connector 3a such that the electrodes 7aa, 7ab, 7ac, and 7ad are connected to the electrodes 5aa, 5ab, 5ac, and 5ad. Additionally, the first module 2a is attached to the second connector 3b disposed in the N+1 row (i.e. an even-number row), and therefore the control unit 12 is electrically connected to the second connector 3b such that the electrodes 7aa, 7ab, 7ac, and 7ad are connected to the electrodes 5aa, 5ab, 5ac, and 5ad.

In FIG. 6, the electrodes 5ba, 5bb, 5bc, and 5bd of the second connector 3b are aligned in the reverse order of lanes compared to the electrodes 5aa, 5ba, 5bc, and 5bd of the first connector 3a. This prevents the control unit 12 of the first module 2a attached to the first connector 3a from recognizing the control unit 12 of the first module 2a attached to the second connector 3b. That is, the control units 12 cannot recognize each other through the data transmission line 4. In other words, the control units 12 may operate as independent servers.

In contrast, as shown in FIG. 5, the first module 2a is attached to the first module 3a disposed in the N row while the second module 2b is attached to the second module 3b disposed in the N+1 row. Herein, the expansion unit 13 is electrically connected to the second connector 3b such that the electrodes 7aa, 7ab, 7ac, and 7ad are connected to the electrodes 5ba, 5bb, 5bc, and 5bd. The electrodes 7aa, 7ab, 7ac, and 7ad of the second module 2b are aligned in the same order of lanes as the electrodes 5ba, 5bb, 5bc, and 5bd of the second connector 3b. This makes it possible for the control unit 12 to recognize the expansion unit 13. Thus, it is possible to carry out data transmission between the control unit 12 and the expansion unit 13. That is, it is possible for the control unit 12 to control the expansion unit 13. In other words, it is possible to expand the communication function of the first module 2a since a pair of first and second modules 2a, 2b is combined together to operate as a single server.

In the above, it is necessary to recognize the operation of the second module 2b at the predetermined timing since the first module 2a attached to the first connector 3a determines whether or not the second module 2b is attached to the second connector 3b. The third embodiment refers to a pair of first and second modules 2a, 2b with reference to FIGS. 5 and 6, but the third embodiment is applicable to the computer 201 of FIG. 2 in which a plurality of connectors 3 is aligned on the substrate 10.

Figure 8:
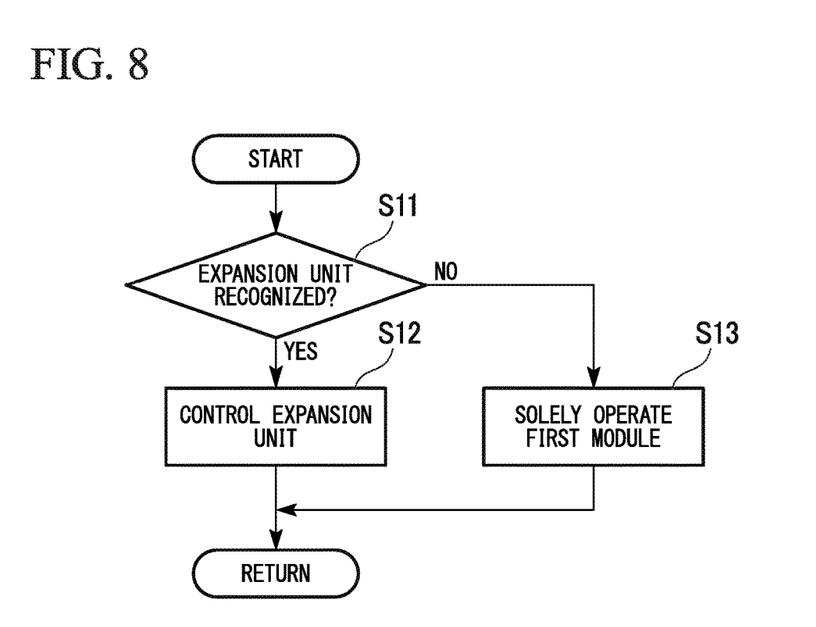
FIG. 8 is a flowchart showing an opening control process to open a data transmission line with a module included in the computer of the third embodiment.

Next, an opening control process adapted to the computer 301 of the third embodiment in which the first module 2a opens the data communication line 4 will be described with reference to FIG. 8. FIG. 8 is a flowchart showing the opening control process executed by the first module 2a of the computer 301 of the third embodiment.

First, the first module 2a is attached to the first connector 3a. Herein, the first connector 3a supplies electric power to the first module 2a. The control unit 12 of the first module 2a determines whether or not the second module 2b can be recognized through the data transmission line 4 (step S11; a determination process). Specifically, the control unit 12 determines whether or not the expansion unit 13 can be recognized through the data transmission line 4. When the determination result of S11 indicates the recognition of the expansion unit 13 of the second module 2b ("YES" in step S11), the control unit 12 of the first module 2a carries out an opening control process in an interactive communication with the second module 2b, thus starting to control the expansion unit 13 of the second module 2b (step S12; an expansion control process). When the determination result of step S11 does not indicates recognition of the expansion unit 13 ("NO" in step S11), the control unit 12 starts to solely operate the first module 2a acting as an independent server without expanding any function (step S13; an independent operation process).

The third embodiment eliminates the necessity of arranging a specific connector dedicated to the second module 2b configured to expand the server function of the first module 2a. To expand the server function of the first module 2a, it is necessary to attach the first module 2a to the first connector 3a disposed in the N row while attaching the second module 2b to the second connector 3b which is disposed in the N+1 row so as to adjoin the first connector 3a in the direction D1. For this reason, it is possible to flexibly and easily expand the server function according to a client's specification.

When the first module 2a is attached to the second connector 3b disposed in the N+1 row, it is possible to operate each of the first module 2a attached to the first connector 3a in the N row and the other first module 2a attached to the second connector 3b disposed in the N+1 row as an independent server. Thus, it is possible to improve expandability in a high-density server. Additionally, it is possible to prevent complexity of design and an increase in cost in expanding functions of servers.

In assembling the computer 301, it is possible to attach either the first module 2a or the second module 2b to the second connector 3b, thus selectively implementing a first mode of expanding the expandability of the first module 2a attached to the first connector 3a or a second mode of independently operating the first module 2a. The above selection between the first and second modes can be implemented without using any switching operation on the data transmission line 4. As a result, it is possible to prevent complexity in an assembling operation while alleviating the working load of an operator.

When a pair of first modules 2a is attached to a pair of first and second connectors 3a, 3b, it is possible to start operating each of the first modules 2a as an independent server. Thus, it is possible to speedily start operating each server.

The present invention is not necessarily limited to the foregoing embodiments; hence, the present invention may embrace any variation modifying the foregoing embodiments without departing from the subject matter of the invention. That is, the aforementioned shapes and configurations of computers are illustrative but not restrictive; hence, it is possible to modify shapes and configuration of computers according to requirements and specifications of designs.

Additionally, the shapes of the first and second connectors 3a, 3b are not necessarily limited to the foregoing shapes of connectors 3. For example, the third embodiment shows that the electrodes 5aa, 5ab, 5ac, and 5ad are aligned in the longitudinal direction of the first connector 3a while the electrodes 5ba, 5bb, 5bc, and 5bd are aligned in the longitudinal direction of the second connector 3b. However, the alignment direction of the electrodes 5aa, 5ab, 5ac, 5ad and the alignment direction of the electrodes 5ba, 5bb, 5bc, and 5bd are not necessarily limited to the longitudinal directions of the first and second connectors 3a, 3b.

The third embodiment refers to the second module 2b having the expansion unit 13 configured to expand the communication function (LAN); however, the expanded function of each server is not necessarily limited to the communication function.

As shown in FIGS. 5 and 6, it is possible to provide a computer-readable storage medium D configured to store programs describing the operation and function of the first module 2a installed in the computer 301. In this case, the computer system, implemented by the control unit 12 of the first module 2a, may load programs from the storage medium D so as to execute the operation and function of the first module 2a in connection with other parts of the computer 301. Herein, the "computer system" may embrace software such as an operating system (OS) and hardware such as peripheral devices. Additionally, the "computer system" using the world-wide-web (WWW) system may embrace homepage providing/displaying environments. The "computer-readable storage media" refer to magnetic disks, magneto-optical disks, CD-ROM, DVD-ROM, semiconductor memory, etc. Moreover, it is possible to deliver programs to the computer system through communication lines, and therefore the computer system will be able to execute programs.

The above programs may implement part of the foregoing functions. Alternatively, the above programs can be produced as differential files (or differential programs) which can be combined with pre-installed programs of the computer system so as to implement the foregoing functions. For example, it is possible to produce an opening control program causing a computer to implement a determination process configured to determine whether or not a first module recognizes a second module, an expansion control process configured to allow the first module to control the second module when the determination process determines that the first module recognizes the second module, and an independent operation process configured to independently operate the first module when the determination process does not determine that the first module recognizes the second module.

Lastly, it possible to further modify the foregoing embodiments and variations within the scope of the invention defined by the appended claims.

The invention claimed is:

1. A computer comprising:
a first module having a first order of lanes;
a second module, having a second order of lanes reverse to the first order of lanes, configured to expand a function of the first module;
a first connector having the first order of lanes and connectible to the first module;
a second connector having the second order of lanes and connectible to either the first module or the second module; and
a data transmission line configured to connect the first connector to the second connector via a plurality of lanes,
wherein the first module connected to the first connector recognizes the second module through the data transmission line only when the second module is connected to the second connector, thus expanding the function of the first module using the second module.

2. The computer according to claim 1, wherein the first module having a lane reverse function further includes a lane reverse suspension part configured to suspend the lane reverse function when the first module is connected to the second connector.

3. A server comprising the computer according to claim 1, wherein the first module includes a control unit while the second module includes an expansion unit configured to expand a function of the control unit.

4. A server comprising the computer according to claim 1, further comprising a substrate configured to attach the first connector and the second connector thereon while forming the data transmission line thereon.

5. A computer comprising each having a first order of lanes:
a plurality of first modules;
a plurality of second modules, each having a second order of lanes reverse to the first order of lanes, configured to expand a function for each of the plurality of first modules;

a plurality of first connectors, each having a first order of lanes and each connectible to each of the plurality of first modules;

a plurality of second connectors, each having a second order of lanes and each connectible to either the first module or the second module; and a plurality of data transmission lines configured to connect the plurality of first connectors to the plurality of second connectors via a plurality of lanes, wherein the plurality of first connectors and the plurality of second connectors are alternately aligned in a first direction and connected together via the plurality of data transmission lines, wherein the plurality of first connectors or the plurality of second connectors are aligned in a second direction perpendicular to the first direction, and wherein the first module connected to the first connector recognizes the second module through the data transmission line only when the second module is connected to the second connector, thus expanding the function of the first module using the second module.

6. A connector set detachably attached to either a first module having a first order of lanes or a second module having a second order of lanes reverse to the first order of lanes and configured to expand a function of the first module, comprising:

a first connector having the first order of lanes and connectible to the first module;

a second connector having the second order of lanes and connectible to either the first module or the second module; and a data transmission line configured to connect the first connector to the second connector via a plurality of lanes, wherein the first module connected to the first connector recognizes the second module through the data transmission line only when the second module is connected to the second connector, thus expanding the function of the first module using the second module.

7. A computer comprising:

a first module having a first order of lanes;

a second module having a second order of lanes reverse to the first order of lanes and configured to expand a function of the first module;

a first connector having the first order of lanes and connectible to the first module;

a second connector having the second order of lanes and connectible to either the first module or the second module; and a data transmission line configured to connect the first connector to the second connector, wherein the first module connected to the first connector recognizes the second module through the data transmission line only when the second module is connected to the second connector, thus expanding the function of the first module using the second module.

* * * * *